(12) United States Patent
Kim et al.

(10) Patent No.: US 10,782,816 B2
(45) Date of Patent: Sep. 22, 2020

(54) ELECTRONIC APPARATUS AND METHOD FOR IMPLEMENTING USER INTERFACE

(71) Applicant: Samsung Electronics Co., Ltd., Suwon-si, Gyeonggi-do (KR)

(72) Inventors: Hyun-jin Kim, Seo-gu (KR); Yong-gook Park, Yongin-si (KR); Ji-yeon Kwak, Seoul (KR); Min-kyu Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/944,959

(22) Filed: Nov. 18, 2015

(65) Prior Publication Data

US 2016/0070401 A1  Mar. 10, 2016

Related U.S. Application Data

(63) Continuation of application No. 12/357,632, filed on Jan. 22, 2009.

(30) Foreign Application Priority Data

Aug. 1, 2008  (KR) ........................ 10-2008-0075757

(51) Int. Cl.
| | |
|---|---|
| *G06F 3/041* | (2006.01) |
| *G06F 3/044* | (2006.01) |
| *G06F 3/0481* | (2013.01) |
| *G06F 3/0482* | (2013.01) |
| *G06F 3/0488* | (2013.01) |

(52) U.S. Cl.
CPC ............ *G06F 3/0414* (2013.01); *G06F 3/044* (2013.01); *G06F 3/0482* (2013.01); *G06F 3/04817* (2013.01); *G06F 3/04886* (2013.01); *G06F 2203/04106* (2013.01)

(58) Field of Classification Search
None
See application file for complete search history.

(56) References Cited

U.S. PATENT DOCUMENTS 5,664,133 A * 9/1997 Malamud .............. G06F 3/0482
345/902
7,002,556 B2   2/2006 Tsukada et al.
(Continued)

FOREIGN PATENT DOCUMENTS

| CN | 1531674 A | 9/2004 |
|---|---|---|
| CN | 1808362 A | 7/2006 |

(Continued)

OTHER PUBLICATIONS

Chinese Office Action dated Jul. 31, 2019, issued in Chinese Application No. 201610941971.5.

(Continued)

*Primary Examiner* — Christopher R Lamb
(74) *Attorney, Agent, or Firm* — Jefferson IP Law, LLP

(57) ABSTRACT

An electronic apparatus and method of implementing a user interface according to a pressure intensity of a touch on the electronic apparatus, the method including detecting a position at which the touch is input, identifying the type of object displayed on the position, and detecting the pressure intensity. Accordingly, the user can manipulate electronic apparatuses with greater convenience.

28 Claims, 23 Drawing Sheets

(56) References Cited

U.S. PATENT DOCUMENTS

| | | |
|---|---|---|
| 7,012,595 B2 | 3/2006 | Lu |
| 7,619,616 B2 | 11/2009 | Rimas Ribikauskas et al. |
| 7,777,730 B2 | 8/2010 | Geurts et al. |
| 8,212,790 B2 | 7/2012 | Rimas Ribikauskas et al. |
| 8,760,410 B2 | 6/2014 | Yoo et al. |
| 9,116,612 B2 | 8/2015 | Rimas-Ribikauskas et al. |
| 2001/0042063 A1* | 11/2001 | Ebert ............... G06F 17/30873 |
| 2002/0140680 A1 | 10/2002 | Lu |
| 2002/0196238 A1 | 12/2002 | Tsukada et al. |
| 2004/0021643 A1 | 2/2004 | Hoshino et al. |
| 2004/0204129 A1* | 10/2004 | Payne ..................... G06F 3/016 |
| | | 455/566 |
| 2006/0026521 A1 | 2/2006 | Hotelling et al. |
| 2006/0026535 A1 | 2/2006 | Hotelling et al. |
| 2006/0132455 A1* | 6/2006 | Rimas-Ribikauskas .................... |
| | | G06F 3/0414 |
| | | 345/173 |
| 2006/0132457 A1 | 6/2006 | Rimas-Ribikauskas et al. |
| 2006/0161870 A1 | 7/2006 | Hotelling et al. |
| 2006/0279548 A1 | 12/2006 | Geaghan |
| 2007/0038688 A1* | 2/2007 | Morrill .............. G06F 21/6236 |
| 2007/0222768 A1 | 9/2007 | Geurts et al. |
| 2007/0229476 A1 | 10/2007 | Huh |
| 2008/0074399 A1* | 3/2008 | Lee ..................... G06F 3/0482 |
| | | 345/173 |
| 2008/0163053 A1* | 7/2008 | Hwang ................ G06F 3/0482 |
| | | 715/702 |
| 2008/0180402 A1 | 7/2008 | Yoo et al. |
| 2008/0288895 A1 | 11/2008 | Hollemans et al. |
| 2009/0072670 A1* | 3/2009 | Hansson ................. G01D 5/18 |
| | | 310/338 |
| 2010/0060605 A1 | 3/2010 | Rimas-Ribikauskas et al. |
| 2010/0088634 A1* | 4/2010 | Tsuruta ................ G06F 3/0488 |
| | | 715/800 |
| 2012/0274591 A1 | 11/2012 | Rimas-Ribikauskas et al. |
| 2014/0229898 A1* | 8/2014 | Terwedo ............. G06F 3/04817 |
| | | 715/835 |
| 2016/0070401 A1 | 3/2016 | Kim |

FOREIGN PATENT DOCUMENTS

| | | |
|---|---|---|
| CN | 101042300 A | 9/2007 |
| CN | 101231564 A | 7/2008 |
| CN | 107102759 A | 8/2017 |
| JP | 06-180624 A | 6/1994 |
| JP | 10-171600 A | 6/1998 |
| JP | 2002-358162 A | 12/2002 |
| JP | 2003-005912 A | 1/2003 |
| JP | 2005-352924 A | 12/2005 |
| JP | 2006-039745 A | 2/2006 |
| JP | 2006-236143 A | 9/2006 |
| JP | 2007-536669 A | 12/2007 |
| JP | 2008-016053 A | 1/2008 |
| JP | 2008-065730 A | 3/2008 |
| KR | 10-2007-0036075 A | 4/2007 |
| KR | 10-2008-0005021 A | 1/2008 |
| WO | WO2008-090902 * | 8/2008 ............. G06F 3/048 |

OTHER PUBLICATIONS

Chinese Office Action dated Jun. 11, 2019, issued in Chinese Application No. 201710201081.5.

Chinese Office Action dated Nov. 19, 2019, issued in Chinese Application No. 201710201081.5.

Chinese Rejection Decision dated Mar. 4, 2020, issued in Chinese Patent Application No. 201710201081.5.

Chinese Office Action dated May 21, 2020, issued in Chinese Patent Application No. 201610941971.5.

* cited by examiner

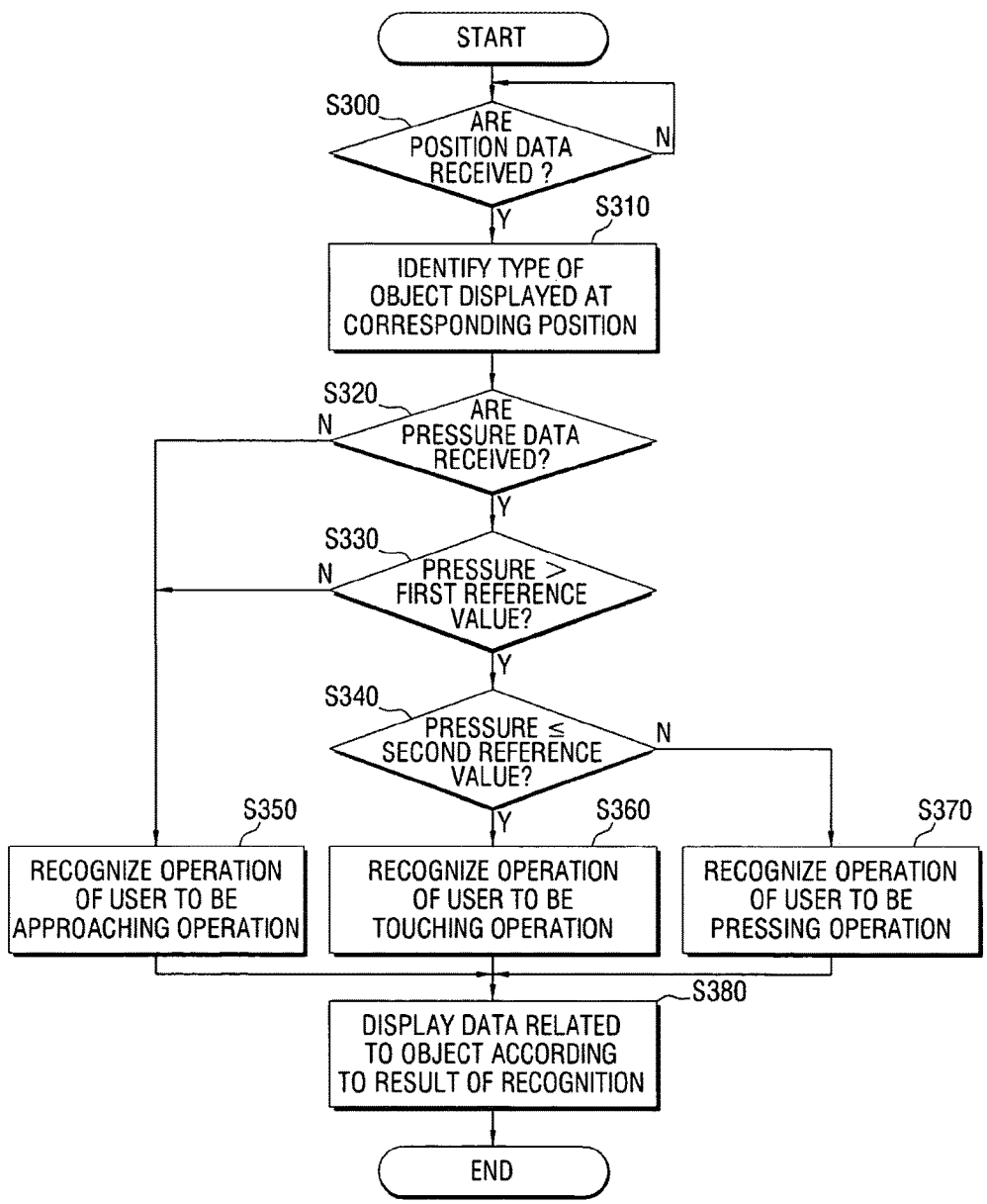

ELECTRONIC APPARATUS AND METHOD FOR IMPLEMENTING USER INTERFACE

CROSS-REFERENCE TO RELATED APPLICATION

This application is a continuation application of prior application Ser. No. 12/357,632, filed on Jan. 22, 2009, which claimed the benefit of Korean Application No. 10-2008-0075757, filed Aug. 1, 2008 in the Korean Intellectual Property Office, the disclosure of each of which is incorporated herein by reference.

BACKGROUND OF THE INVENTION

1. Field of the Invention

Aspects of the present invention relate to an electronic apparatus and method of implementing a user interface, and more particularly, to an electronic apparatus and method of implementing a user interface using a touch screen.

2. Description of the Related Art

Electronic apparatuses implement diverse types of user interfaces. Accordingly, users control the operation of electronic apparatuses and utilize various operations of the electronic apparatuses using such user interfaces. Recently, as electronic apparatuses have become miniaturized and the range of operations thereof has increased, manipulation keys and/or a mouse for manipulating the operations of the electronic apparatuses have become widely implemented as a user interface on a touch screen. In particular, in mobile electronic apparatuses, the importance of user interfaces implemented on a touch screen is increasing. Furthermore, diverse kinds of user interfaces are developing due to the development of technologies related to the touch screen.

Therefore, there is a need for methods by which a user is able to operate a user interface more easily and conveniently.

SUMMARY OF THE INVENTION

Aspects of the present invention provide an electronic apparatus and method of implementing a user interface according to a type of object displayed on a position of a touch screen corresponding to a user command, and a pressure intensity with which a user touches the touch screen, so the electronic apparatus may be efficiently manipulated.

According to an aspect of the present invention, there is provided an electronic apparatus including: a display unit including a touch screen to display an object and to receive a user input; a sensing unit to sense whether the displayed object is approached or touched; and a control unit to control the display unit to display data related to the displayed object according whether the displayed object is approached or touched, as sensed by the sensing unit, and/or a type of object.

The sensing unit may include a position detector, and a pressure detector to detect the pressure intensity.

The control unit may recognize that the position is approached if position data corresponding to the position is received from the position detector and a pressure intensity that is lower than a predetermined minimum value is received from the pressure detector.

The control unit may recognize that the position is touched if position data corresponding to the position is received from the position detector and a pressure intensity that is higher than a predetermined minimum value is received from the pressure detector.

The control unit may recognize that the position is pressed if position data corresponding to the position is received from the position detector and a pressure intensity that is higher than a reference value, which is higher than the predetermined minimum value, is received from the pressure detector.

If position data corresponding to the position is received from the position detector, the control unit may determine the type of object displayed at the position based on the position data, and may control the display unit to display the data related to the object according to the pressure intensity received from the pressure detector.

If determined that a menu is displayed at the approached position, and a pressure intensity that is lower than a predetermined minimum value is output as a result of the sensing, the control unit may control the display unit to display a sub menu of the menu.

If determined that a menu is displayed at the approached position, and a pressure intensity that is higher than a predetermined minimum value is output as a result of the sensing, the control unit may select the menu.

If determined that the menu is displayed at the approached position, and a pressure intensity that is higher than a reference value, which is higher than the predetermined minimum value, is output as a result of the sensing, the control unit may control the display unit to display a direct menu item of the menu.

If determined that content is displayed at the approached position, and a pressure intensity that is lower than a predetermined minimum value is output as a result of the sensing, the control unit may control the display unit to display a summary screen of the content.

If determined that content is displayed at the approached position, and a pressure intensity that is higher than a predetermined minimum value is output as a result of the sensing, the control unit may play back the content.

If determined that a title of the content is displayed at the approached position, and a pressure intensity that is higher than a reference value, which is higher than the predetermined minimum value, is output as a result of the sensing, the control unit may control the display unit to display a control menu of the content.

If determined that the content is being played back at the approached position, and the pressure intensity that is higher than the reference value higher is output as the result of the sensing, the control unit may control the display unit to display a control menu regarding the playback of the content.

If determined that an icon is displayed at the approached position, and a pressure intensity that is lower than a predetermined minimum value is output as a result of the sensing, the control unit may control the display unit to display detailed information regarding the icon and/or to enlarge the icon.

If determined that an icon is displayed at the approached position, and a pressure intensity that is higher than a predetermined minimum value is output as a result of the sensing, the control unit may execute an operation corresponding to the icon.

If determined that the icon is displayed at the approached position, and a pressure intensity that is higher than a reference value, which is higher than the predetermined minimum value, is output as a result of the sensing, the control unit may control the display unit to display a control menu regarding the icon.

If determined that a character is displayed at the approached position, and a pressure intensity that is lower than a predetermined minimum value is output as a result of the sensing, the control unit may control the display unit to enlarge the character.

If determined that a character is displayed at the approached position, and a pressure intensity that is lower than a predetermined minimum value is output for longer than a predetermined period of time as a result of the sensing, the control unit may control the display unit to display one or more predetermined terms related to the character.

If determined that a character is displayed at the approached position, and a pressure intensity that is higher than a predetermined minimum value is output as a result of the sensing, the control unit may control the display unit to display the character on an input window.

If determined that a character is displayed at the approached position, and a pressure intensity that is higher than a reference value, which is higher than the predetermined minimum value, is output as a result of the sensing, the control unit may control the display unit to display a predetermined term related to the character on the input window.

According to another aspect of the present invention, there is provided a method of implementing a user interface for an electronic apparatus including a sensing unit that senses whether an object displayed on a display unit is approached or touched, the method including: receiving a result of the sensing output by the sensing unit; determining a type of the object displayed on an approached or touched position based on the result of the sensing output by the sensing unit; and controlling the display unit to display related data of the object according to the type of object and/or according to whether the object is touched or approached.

The method may further include detecting a position of the touch or approach, and detecting the pressure intensity of the touch or approach.

The determining of the type of the object may include recognizing that the position is approached if position data corresponding to the position is received and a pressure intensity that is lower than a predetermined minimum value is received.

The determining of the type of the object may include recognizing that the position is touched if position data corresponding to the position is received and a pressure intensity that is higher than a predetermined minimum value is received.

The determining of the type of the object may include recognizing that the position is pressed if the position data corresponding to the position is received and a pressure intensity that is higher than a reference value, which is higher than the predetermined minimum value, is received.

The determining of the type of the object may include, if position data corresponding to the position is received, the type of the object displayed at the position is determined based on the position data, and the controlling of the display unit may include controlling the display unit to display the data related to the object according to the pressure intensity.

The controlling of the display unit may include, if determined that a menu is displayed at the approached position, and a pressure intensity that is lower than a predetermined minimum value is output as a result of the sensing, displaying a sub menu of the menu.

The controlling of the display unit may include, if determined that a menu is displayed at the approached position, and a pressure intensity that is higher than a predetermined minimum value is output as a result of the sensing, selecting the menu.

The controlling of the display unit may include, if determined that the menu is displayed at the approached position, and a pressure intensity that is higher than a reference value, which is higher than the predetermined minimum value, is output as a result of the sensing, displaying a direct menu item of the menu.

The controlling of the display unit may include, if determined that content is displayed at the approached position, and a pressure intensity that is lower than a predetermined minimum value is output as a result of the sensing, displaying a summary screen of the content.

The controlling of the display unit may include, if determined that content is displayed at the approached position, and a pressure intensity that is higher than a predetermined minimum value is output as a result of the sensing, playing back the content.

The controlling of the display unit may include, if determined that a title of the content is displayed at the approached position, and a pressure intensity that is higher than a reference value, which is higher than the predetermined minimum value, is output as a result of the sensing, displaying a control menu of the content.

The controlling of the display unit may include, if determined that the content is being played back at the approached position, and the pressure intensity that is higher than the reference value is output as the result of the sensing, displaying a control menu regarding the playback of the content.

The controlling of the display unit may include, if determined that an icon is displayed at the approached position, and a pressure intensity that is lower than a predetermined minimum value is output as a result of the sensing, displaying detailed information regarding the icon and/or enlarging the icon.

The controlling of the display unit may include, if determined that an icon is displayed at the approached position, and a pressure intensity that is higher than a predetermined minimum value is output as a result of the sensing, executing an operation corresponding to the icon.

The controlling of the display unit may include, if determined that the icon is displayed at the approached position, and a pressure intensity that is higher than a reference value, which is higher than the predetermined minimum value, is output as a result of the sensing, displaying a control menu regarding the icon.

The controlling of the display unit may include, if determined that a character is displayed at the approached position, and a pressure intensity that is lower than a predetermined minimum value is output as a result of the sensing, enlarging the character.

The controlling of the display unit may include, if determined that the character is displayed at the approached position, and the pressure intensity that is lower than the predetermined minimum value is output for longer than a predetermined period of time as the result of the sensing, displaying one or more predetermined terms related to the character.

The controlling of the display unit may include, if determined that a character is displayed at the approached position, and a pressure intensity that is higher than a predetermined minimum value is output as a result of the sensing, displaying the character on an input window.

The controlling of the display unit may include, if determined that the character is displayed at the approached position, and a pressure intensity that is higher than a reference value, which is higher than the predetermined minimum value, is output as a result of the sensing, displaying a predetermined term related to the character on the input window.

The controlling of the display unit may include, if determined that the character is displayed at the approached position, and a pressure intensity that is higher than a reference value, which is higher than the predetermined minimum value, is output as a result of the sensing, displaying a predetermined term, from among a plurality of predetermined terms related to the character, mapped according to the pressure intensity on the input window.

According to another aspect of the present invention, there is provided a method of implementing a user interface for an electronic apparatus comprising a display unit to display an object, the method including: controlling the display unit to display data related the displayed object according to a pressure intensity of a touch on the displayed object.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 8 is a flow chart illustrating an operation of an electronic apparatus according to an embodiment of the present invention.

DETAILED DESCRIPTION OF THE EMBODIMENTS

Figure 1:
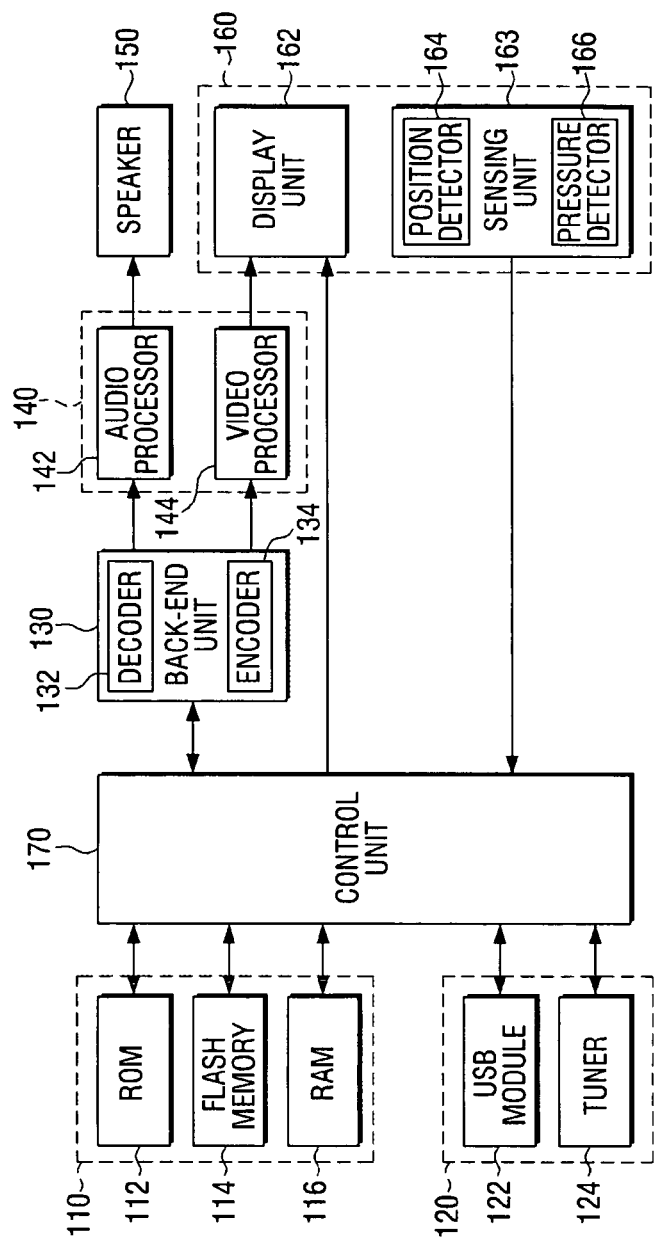
FIG. 1 is a schematic block diagram of an electronic apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a schematic block diagram of an electronic apparatus according to an embodiment of the present invention. In FIG. 1, a Moving Picture Experts Group layer 3 (MP3) player is illustrated as an example of a kind of portable electronic apparatus. However, it is understood that aspects of the present invention are not limited thereto, and can be applied to any portable electronic apparatus (such as a personal digital assistant (PDA), a portable multimedia player (PMP), and a mobile phone). Referring to FIG. 1, the MP3 player includes a storage unit 110, a communication interface unit 120, a back-end unit 130, a signal processing unit 140, a speaker 150, a touch screen 160, and a control unit 170.

The storage unit 110 stores diverse data used to operate the MP3 player, and includes a Read Only Memory (ROM) 112, a flash memory 114, and a Random Access Memory (RAM) 116. However, it is understood that according to other aspects, the storage unit 110 may include fewer than the above mentioned storage devices 112, 114, and 116, or additional and/or alternative storage devices (such as a hard disk drive).

The ROM 112 stores diverse control data used to control the MP3 player, such as control programs and a control menu to control the MP3 player, icons, etc. The control data in the ROM 112 is not deleted even when the MP3 is powered off. The flash memory 114 is a storage memory to store contents such as moving images and still images. Such data in the flash memory 114 is not deleted even when the MP3 is powered off. However, the contents stored in the flash memory 114 may be deleted or updated as desired, and other content can be added. The RAM 116 temporarily stores data generated while the MP3 player is operating. Unlike the ROM 112 and the flash memory 114, such data is deleted from the RAM 116 when the MP3 player is powered off.

The communication interface unit 120 performs data communication between an external device (not shown) and the MP3 player by control of the control unit 170, and includes a universal serial bus (USB) module 122 and a tuner 124. The USB module 122 is a communication module that communicates with an external device (such as a personal computer (PC) and a laptop computer). The USB module 122 receives data, such as content, from an external device, and transmits content stored in the MP3 player to an external device. The tuner 124 receives broadcast content from broadcasting stations, so a user can use broadcast services through the MP3 player. However, it is understood that according to other aspects, the communication interface unit 120 may use additional and/or alternative communication modules (such as a Bluetooth module and an infrared module).

The back-end unit 130 includes a decoder 132 to decode video data and audio data, and an encoder 134 to encode video data and audio data. The decoder 132 decodes content stored in the flash memory 114 and/or content received through the communication interface unit 120, divides the decoded content into video data and audio video, and outputs the video data and the audio video to the signal processing unit 140. The encoder 134 encodes content received through the communication interface unit 120 in a predetermined format, and stores the encoded content in the flash memory 114.

The signal processing unit 140 processes the video data and the audio data output by the decoder 132, and includes an audio processor 142 and a video processor 144. The audio processor 142 converts the digital audio data output by the decoder 132 into an analog audio signal and outputs the analog audio signal to the speaker 150 or to an external device. The video processor 144 processes the video data output by the decoder 132 so as to be in a format compatible with the display unit 162 or an external display device.

The touch screen 160 includes a display unit 162 and a sensing unit 163. The display unit 162 displays the video data that is output by the video processor 144 and displays a menu and/or icons generated by the control unit 170. The sensing unit 163 is positioned on the display unit 162, senses user commands input by a user through a touch (such as by hand or a touch pen), and transmits the user commands to the control unit 170. Therefore, while watching images on the touch screen 160, the user can input user commands by approaching or touching a desired position on the display unit 162 using his or her hand or a device (such as a touch pen).

The sensing unit 163 includes a position detector 164 to detect a position in which the user's hand or the device approaches or touches, and a pressure detector 166 to detect the pressure intensity at which the detected position is touched. The position detector 164 detects position data corresponding to a position that is approached or touched by the user's hand or the device, and transmits the position data to the control unit 170. The pressure detector 166 detects pressure data corresponding to the pressure intensity at the position touched by the user, and transmits the pressure data to the control unit 170.

The control unit 170 controls the overall operation of the MP3 player according to user commands input through the sensing unit 163. In particular, with reference to the position data received from the position detector 164 and the pressure data received from the pressure detector 166, the control unit 170 changes data to be displayed on the display unit 162. That is, the control unit 170 changes data to be displayed on the display unit 162 according to whether the user approaches or touches a certain position using his or her hand or the device, and according to the type of the object displayed at the certain position (for example, according to whether the type of the object is a menu, an icon, a content, or a character). Furthermore, the control unit 170 changes data to be displayed on the display unit 162 according to how much pressure the user applies when touching the certain position.

Data regarding the approached or touched object is displayed on the display unit 162. Objects and data regarding the objects will be described in detail with reference to FIGS. 3A to 70.

Figure 2:
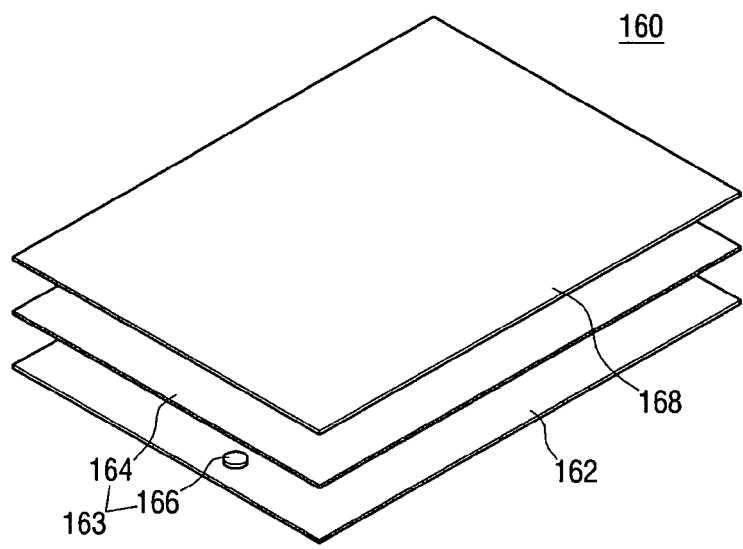
FIG. 2 is a schematic perspective view of a touch screen of an electronic apparatus according to an embodiment of the present invention.

FIG. 2 is a schematic perspective view of a touch screen 160 of an electronic apparatus according to an embodiment of the present invention. Referring to FIG. 2, the touch screen 160 includes a protection glass 168, a position detector 164, a pressure detector 166, and a display unit 162.

The protection glass 168 protects the touch screen 160 from external impacts. The position detector 164 may be implemented as a capacitive overlay touch sensor. If the user's hand or the devices approaches or touches the touch screen 160, the position detector 164 measures change in electric charges at the four edges, and detects the corresponding position. That is, the position detector 164 detects position data corresponding to a position that is approached or touched by the users hand or the device, and transmits the position data to the control unit 170.

Subsequently, the control unit 170 determines whether the touch or approach sensed by the sensing unit 163 is a user command or an unintended approach based on the transmission time of the position data. That is, if the users hand approaches a certain position of the sensing unit 163, the position detector 164 transmits position data corresponding to the position to the control unit 170. If the position data regarding the same position is transmitted from the position detector 164 for a predetermined period of time, the control unit 170 determines that a user command is input to the position. Conversely, if the position data regarding the same position stops being transmitted before the predetermined period of time elapses, the control unit 170 determines that a user command is not input to the position. Therefore, the sensing unit 163 can be prevented from sensing an approach unintended by the user as an input.

The pressure detector 166 may be implemented as a pressure sensor such as a tactile sensor to sense distribution of the pressure. As illustrated in FIG. 2, there may be one or more pressure detectors 166 on the touch screen 160 to sense the pressure on the entire touch screen 160. The control unit 170 determines whether the user's hand or the device approaches the touch screen 160, or touches the touch screen 160 with a certain pressure intensity according to the pressure applied by the hand or the device. Specifically, if the pressure data detected by the pressure detector 166 is lower than a first reference value, the control unit 170 determines that the user's hand or the device approaches the touch screen 160. Alternatively, if a pressure having an intensity that cannot be detected by the pressure detector 166 is applied to the touch screen 160, the pressure detector 166 does not transmit pressure data to the control unit 170. In this case, the control unit 170 also determines that the users hand or the device approaches the touch screen 160. Conversely, if the pressure data detected by the pressure detector 166 is higher than the first reference value, the control unit 170 determines that the user touches the touch screen 160. Furthermore, if the pressure data detected by the pressure detector 166 is higher than a second reference value, the control unit 170 determines that the user presses the touch screen 160.

The first reference value is a minimum value at which touch can be sensed, and the second reference value is higher than the first reference value. According to aspects of the present invention, the control unit 170 recognizes three types of user operations (such as "approach," "touch," and "pressure") according to the pressure intensity detected by the pressure detector 166. Moreover, the control unit 170 changes data displayed on the display unit 162 according to the type of user operation. That is, the control unit 170 determines the type of object displayed at the corresponding position based on the position data detected by the position detector 164, and controls the display unit 162 to display data regarding the object with reference to the pressure data detected by the pressure detector 166.

Figure 3A:
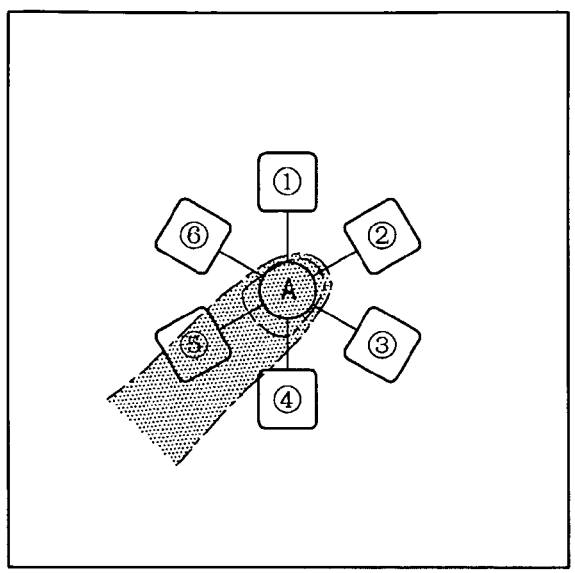
FIGS. 3A to 3C are drawings illustrating a process of constructing a user interface of an electronic apparatus according to an embodiment of the present invention.
Figure 3B:
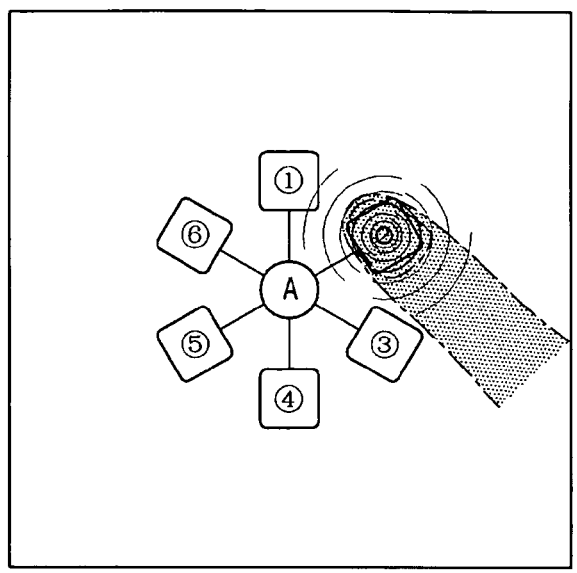
Figure 3C:
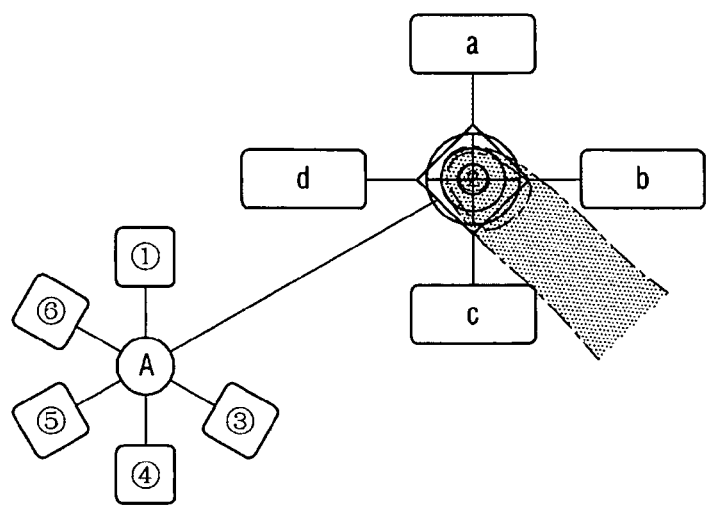

FIGS. 3A to 3C are drawings illustrating a process of constructing a user interface on an electronic apparatus according to an embodiment of the present invention. FIG. 3A illustrates that the users hand approaches menu A. In response to the user's hand approaching menu A, sub menus CD, (2), ®, @, ®, and ® of menu A are displayed on the display unit 162. In greater detail, the position detector 164 transmits to the control unit 170 position data corresponding to the position at which the users hand approaches. Since the pressure detected by the pressure detector 166 is lower than the first reference value, the control unit 170 determines that the user's hand approaches menu A. Accordingly, the control unit 170 controls the display unit 162 to display sub menus of menu A displayed at the position approached by the users hand.

FIG. 3B illustrates that the user's hand touches sub menu (2). In response to the user's hand touching sub menu (2), sub menu (2) is selected. For example, if sub menu (2) is an item for screen adjustment, a user interface to adjust the brightness or shading of the screen may be displayed on the display unit 162. Furthermore, if sub menu (2) is the title of content, the content may be played back, and if sub menu (2) is an icon, an operation corresponding to the icon may be executed. In greater detail, the position detector 164 transmits to the control unit 170 position data corresponding to the position at which the user's hand approaches, and the pressure detector 166 transmits pressure data to the control unit 170. Since the pressure detected by the pressure detector 166 is higher than the first reference value and lower than the second reference value, the control unit 170 determines that sub menu (2) is touched. Accordingly, the control unit 170 selects sub menu (2) displayed at the position touched by the users hand.

FIG. 3C illustrates that the user's hand touches sub menu (2) with a pressure intensity greater than the second reference value. In response to the user's hand touching sub menu (2) with a pressure intensity greater than the second reference value, menu items a, b, c, and d, which are related to sub menu (2), are displayed. Menus a, b, c, and d are direct menu items capable of being directly executed according to the situation (for example, comparable to when a right key of a mouse is clicked). Alternatively, if sub menu (2) is the title of content, menu items a, b, c, and d may be control menus to search for a corresponding content or perform tagging. Also, if sub menu (2) is an icon, menu items a, b, c, and d may be control menu items to copy or delete a corresponding icon.

Figure 4A:
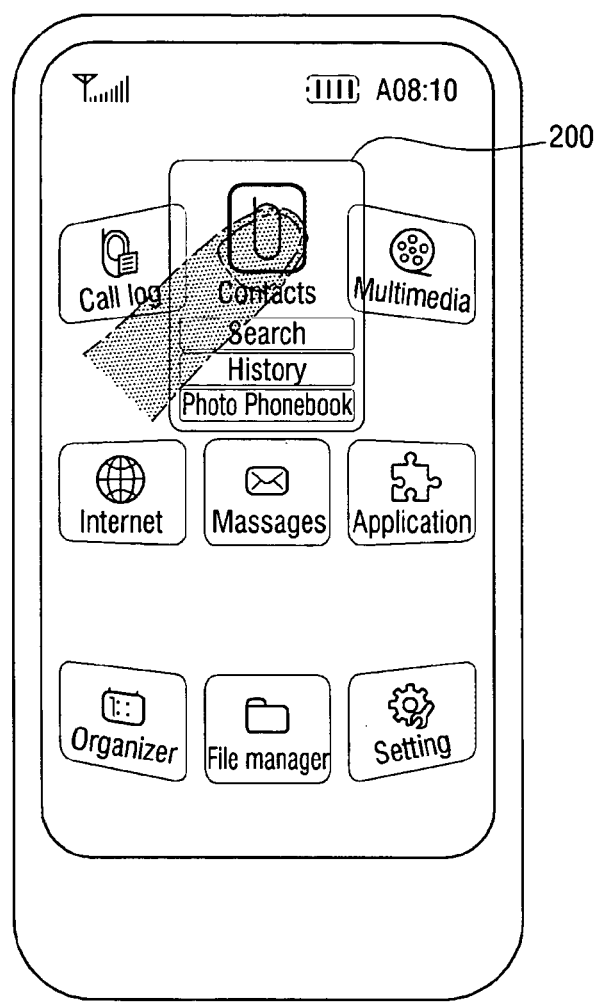
FIGS. 4A to 4D are drawings illustrating a process of constructing a user interface of an electronic apparatus according to another embodiment of the present invention.

FIGS. 4A to 4D are drawings illustrating a process of constructing a user interface of an electronic apparatus according to another embodiment of the present invention. FIG. 4A illustrates that the user's hand approaches menu Contacts 200. In response to the users hand approaching Contacts 200, sub menus of Contacts 200 (for example, Search, History, and Photo Phonebook) are displayed as illustrated in FIG. 4A. In greater detail, the position detector 164 transmits to the control unit 170 position data corresponding to the position at which the user's hand approaches. Since the pressure detected by the pressure detector 166 is lower than the first reference value, the control unit 170 determines that the user's hand approaches Contacts 200. Accordingly, the control unit 170 controls the display unit 162 to display sub menus of Contacts menu 200, which is displayed at the position approached by the user's hand.

Figure 4B:
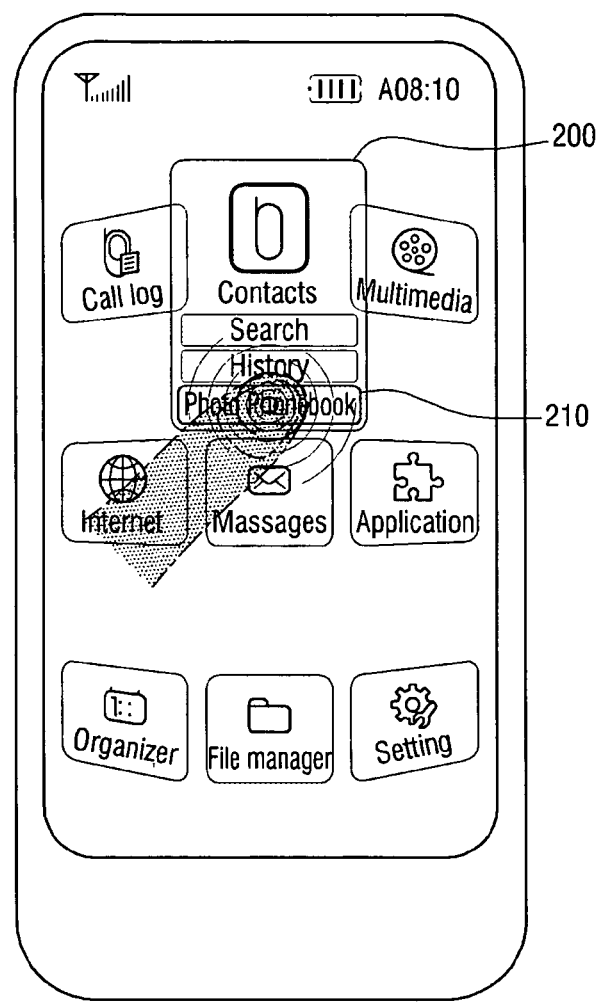
Figure 4C:
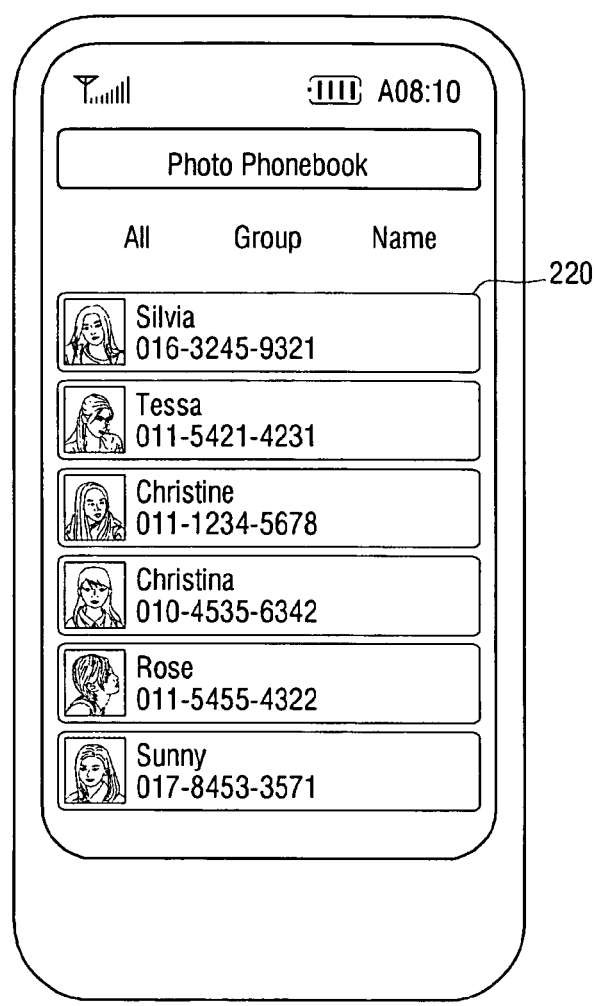

FIG. 4B illustrates that the user's hand touches menu Photo Phonebook 210. In response to the user's hand touching Photo Phonebook 210, Photo Phonebook 210 is selected as illustrated in FIG. 4C. In greater detail, the position detector 164 transmits to the control unit 170 position data corresponding to the position at which the user's hand approaches, and the pressure detector 166 transmits pressure data to the control unit 170. Since the pressure detected by the pressure detector 166 is higher than the first reference value and lower than the second reference value, the control unit 170 determines that Photo Phonebook 210 is touched. Accordingly, the control unit 170 selects Photo Phonebook 210, which is displayed at the position touched by the user's hand, and displays Photo Phonebook 210 as illustrated in FIG. 4C.

Figure 4D:
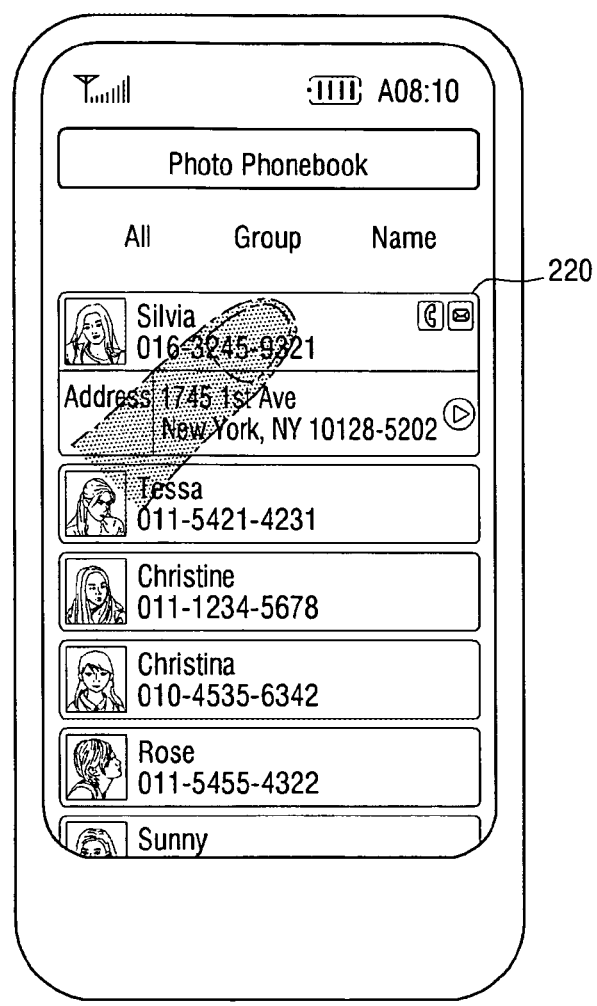

FIG. 4D illustrates that the users hand approaches a first phone number 220. In response to the user's hand approaching the first phone number 220, detailed information regarding the first phone number 220 is displayed as illustrated in FIG. 40. In greater detail, the position detector 164 transmits to the control unit 170 position data corresponding to the position at which the users hand approaches. Since the pressure detected by the pressure detector 166 is lower than the first reference value, the control unit 170 determines that the users hand approaches the first phone number 220. Accordingly, the control unit 170 controls the display unit 162 to display detailed information regarding the first phone number 220.

Figure 5A:
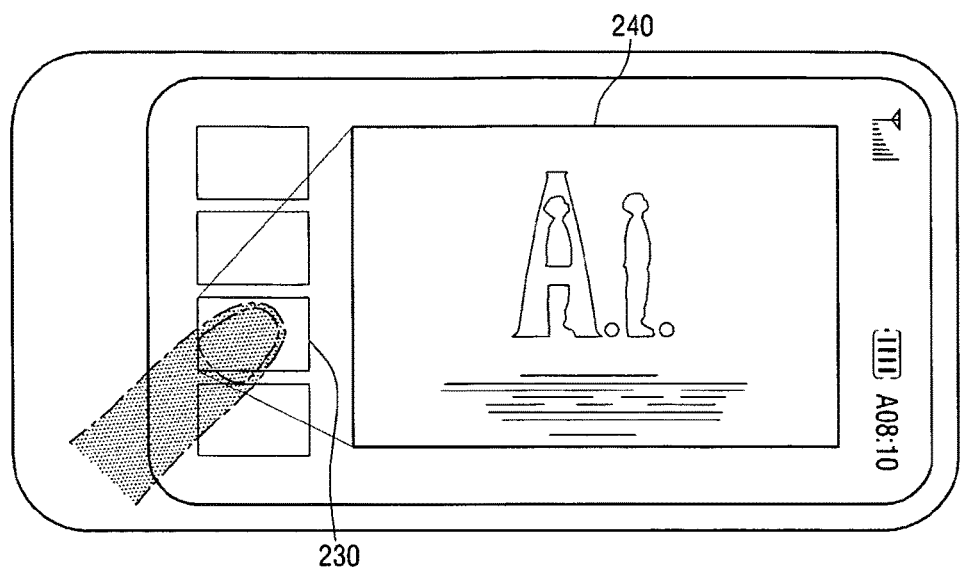
FIGS. 5A to 5E are drawings illustrating a process of constructing a user interface of an electronic apparatus according to another embodiment of the present invention.

FIGS. 5A to 5E are drawings illustrating a process of constructing a user interface of an electronic apparatus according to another embodiment of the present invention. FIG. 5A illustrates that the users hand approaches specific content 230. In response to the user's hand approaching content 230, a preview 240 of the content 230 is displayed as illustrated in FIG. 5A. In greater detail, the position detector 164 transmits to the control unit 170 position data corresponding to the position at which the user's hand approaches. Since the pressure detected by the pressure detector 166 is lower than the first reference value, the control unit 170 determines that the user's hand approaches the content 230. Accordingly, the control unit 170 controls the display unit 162 to display the preview 240 of the content 230 displayed at the position approached by the users hand.

Figure 5B:
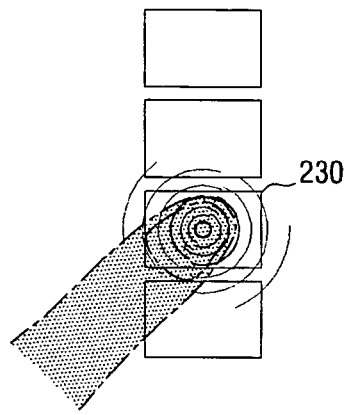
Figure 5C:
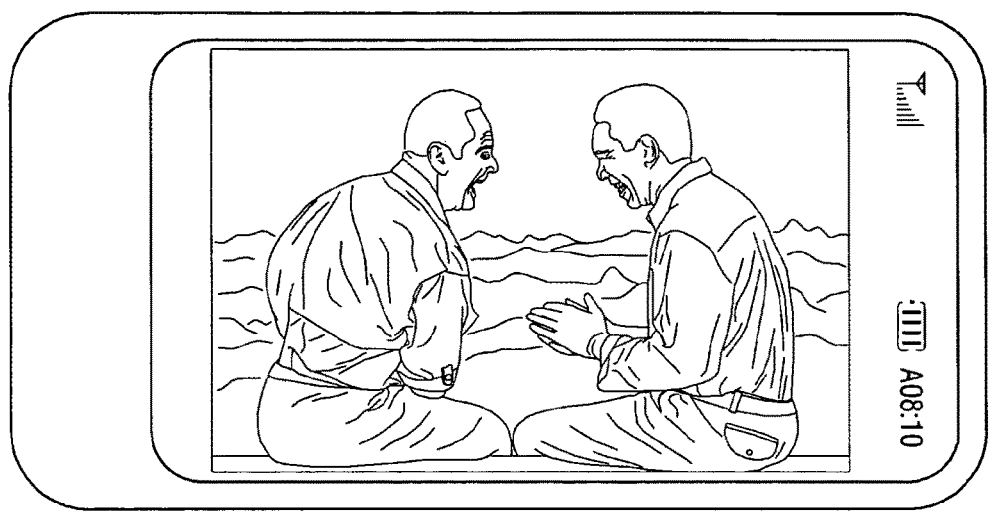

FIG. 5B illustrates that the user's hand touches the content 230. In response to the users hand touching the content 230, the content 230 is played back as illustrated in FIG. 5C. In greater detail, the position detector 164 transmits to the control unit 170 position data corresponding to the position at which the users hand approaches, and the pressure detector 166 transmits pressure data to the control unit 170. Since the pressure detected by the pressure detector 166 is higher than the first reference value and lower than the second reference value, the control unit 170 determines that the content 230 is touched. Accordingly, the control unit 170 plays back and displays the content 230, which is displayed at the position touched by the user's hand as illustrated in FIG. 5C.

Figure 5D:
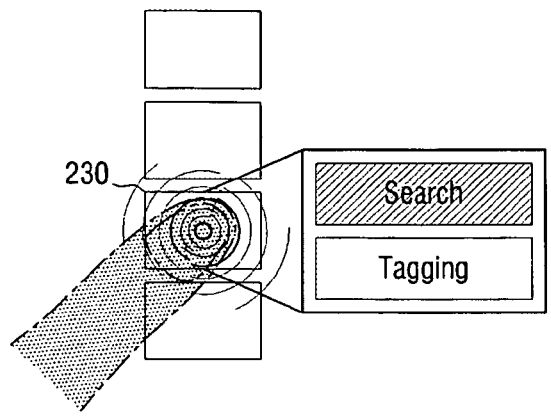

FIG. 5D illustrates that the users hand touches the content 230 with a pressure intensity greater than the second reference value. In response to the users hand touching the content 230 with a pressure intensity greater than the second reference value, a control menu for the content 230 is displayed as illustrated in FIG. 50. That is, a control menu including a "Search" item to search for specific scenes of content corresponding to the content 230, and a "Tagging" item to tag a keyword representing the content is displayed.

Figure 5E:
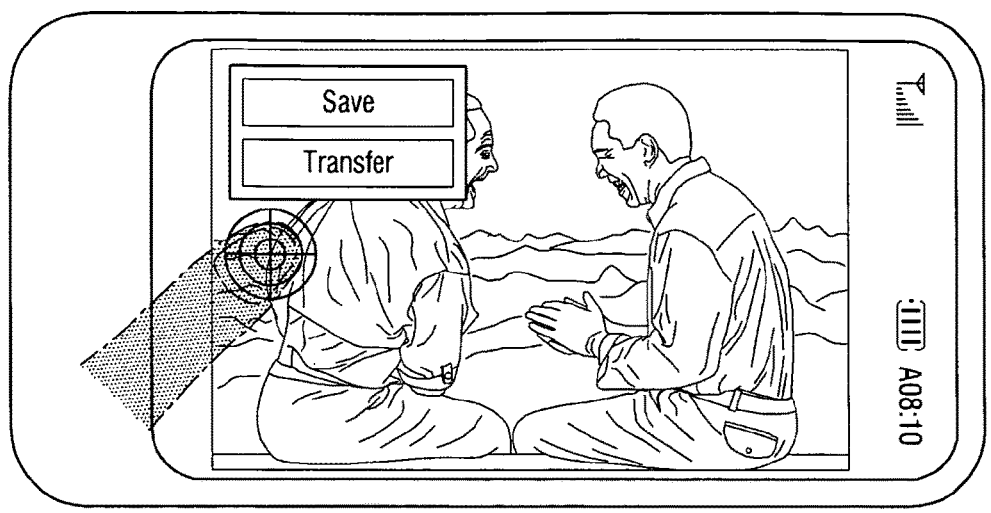

FIG. 5E illustrates that the user touches content with a pressure intensity greater than the second reference value while the content is being played back. In response to the users hand touching the content that is being played back with a pressure intensity greater than the second reference value, a control menu including a "Save" item to save a currently displayed scene, and a "Transfer" item to transfer a currently displayed scene to an external device is displayed.

Figure 6A:
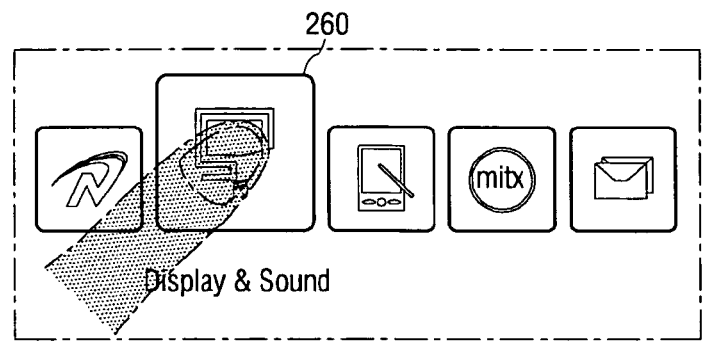
FIGS. 6A to 6D are drawings illustrating a process of constructing a user interface of an electronic apparatus according to another embodiment of the present invention.

FIGS. 6A to 6D are drawings illustrating a process of constructing a user interface of an electronic apparatus according to another embodiment of the present invention. FIG. 6A illustrates that the user's hand approaches an icon 260. In response to the users hand approaching the icon 260, detailed information regarding the icon 260 is displayed as illustrated in FIG. 6A. In greater detail, the position detector 164 transmits to the control unit 170 position data corresponding to the position at which the users hand approaches. Since the pressure detected by the pressure detector 166 is lower than the first reference value, the control unit 170 determines that the user's hand approaches the icon 260.

Accordingly, the control unit 170 controls the display unit 162 to display "Display & Sound" (i.e., detailed information regarding the icon 260 displayed at the position approached by the user's hand).

Figure 6B:
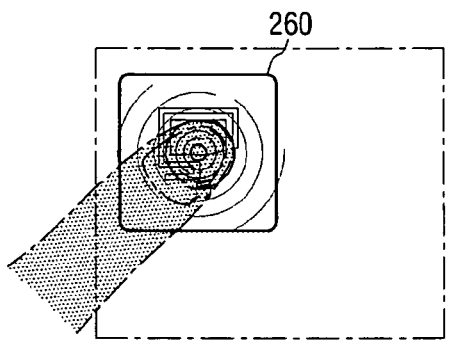
Figure 6C:
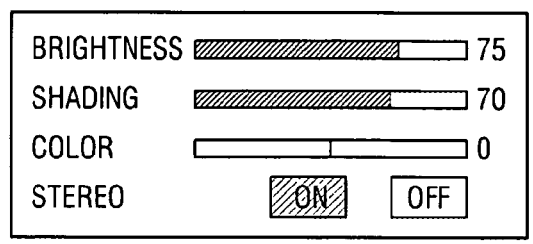

FIG. 6B illustrates that the user's hand touches the icon 260. In response to the users hand touching the icon 260, the icon 260 is executed as illustrated in FIG. 6C. In greater detail, the position detector 164 transmits to the control unit 170 position data corresponding to the position at which the users hand approaches, and the pressure detector 166 transmits pressure data to the control unit 170. Since the pressure detected by the pressure detector 166 is higher than the first reference value and lower than the second reference value, the control unit 170 determines that the icon 260 is touched. Accordingly, the control unit 170 displays a menu corresponding to the icon 260 displayed at the position touched by the user's hand as illustrated in FIG. 6C.

Figure 6D:
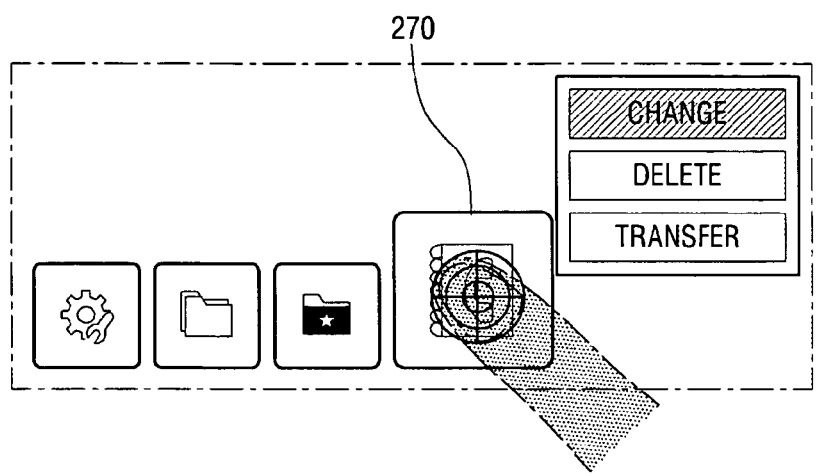

FIG. 6D illustrates that the user's hand touches an icon 270 with a pressure intensity greater than the second reference value. In response to the users hand touching the icon 270 with a pressure intensity greater than the second reference value, a control menu for the icon 270 is displayed as illustrated in FIG. 6D. For example, as illustrated, a control menu including a "Change" item to change the icon 270 to another icon, a "Delete" item to delete the icon 270, and a "Transfer" item to transfer the icon 270 to an external device is displayed.

In response to the user's hand continuing to touch the icon 270 with a pressure intensity greater than the second reference value, the items in the displayed control menu are respectively selected according to the touching time. For example, in response to the user touching the icon 270 with a pressure intensity greater than the second reference value for 1 second, "Change" is selected, in response to the user touching the icon 270 with a pressure intensity greater than the second reference value for 2 seconds, "Delete" is selected, in response to the user touching the icon 270 with a pressure intensity greater than the second reference value for 3 seconds, "Transfer" is selected, and in response to the user touching the icon 270 with a pressure intensity greater than the second reference value for 4 seconds, "Change" is selected.

Figure 7A:
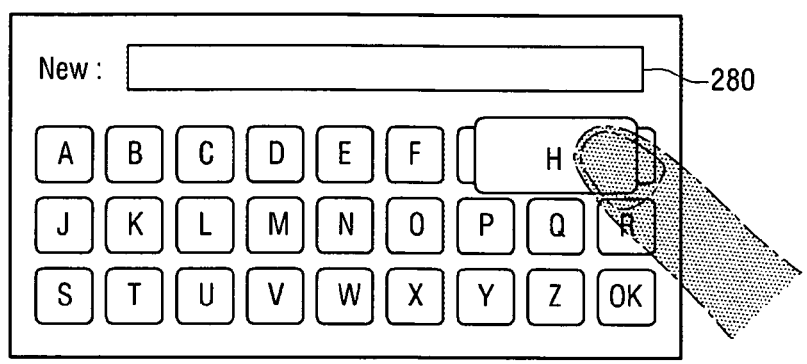
FIGS. 7A to 7D are drawings illustrating a process of constructing a user interface of an electronic apparatus according to another embodiment of the present invention.
Figure 7B:
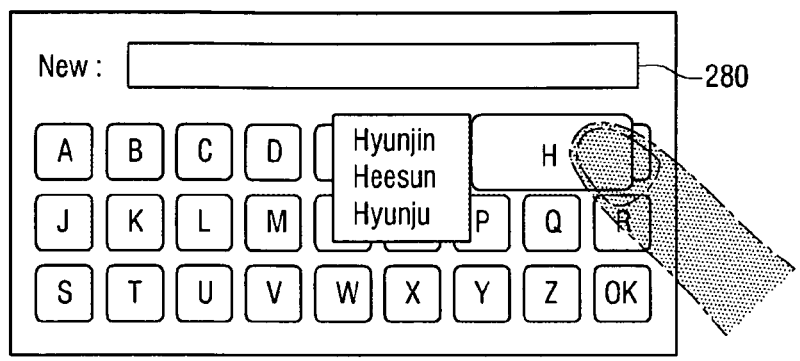

FIGS. 7A to 7D are drawings illustrating a process of constructing a user interface of an electronic apparatus according to another embodiment of the present invention. FIGS. 7A and 7B illustrate that the user's hand approaches a character "H." In response to the user's hand approaching the character "H," the character "H" is enlarged as illustrated in FIG. 7A. In response to the user's hand continuing to approach the character "H," predetermined terms related to the character "H" are displayed as illustrated in FIG. 7B (for example, the most frequently used terms beginning with "H" are displayed).

Assuming that a predetermined time taken to determine whether an approach is intended by a user is a first time, and a predetermined time during which the user's hand continues to approach the character "H" is a second time, the second time is longer than the first time. Accordingly, when the user's hand approaches the character "H," if the control unit 170 determines that the time to transmit the position data is longer than the first time and shorter than the second time, the control unit 170 enlarges the character "H" as illustrated in FIG. 7A. Alternatively, if the control unit 170 determines that the time to transmit the position data is longer than the second time, the control unit 170 displays the predetermined terms related to the character "H" as illustrated in FIG. 7B.

Figure 7C:
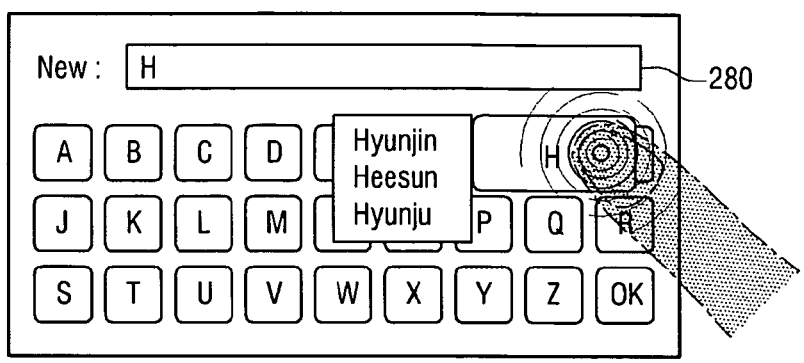

FIG. 7C illustrates that the user's hand touches the character "H." In response to the user's hand touching the character "H," the character "H" is input into an input window 280 as illustrated in FIG. 7C. In greater detail, the position detector 164 transmits to the control unit 170 position data corresponding to the position at which the user's hand approaches, and the pressure detector 166 transmits pressure data to the control unit 170. Since the pressure detected by the pressure detector 166 is higher than the first reference value and lower than the second reference value, the control unit 170 determines that the character "H" is touched. Accordingly, the control unit 170 displays the character "H," which is displayed at the position touched by the user's hand, in the input window 280.

Figure 7D:
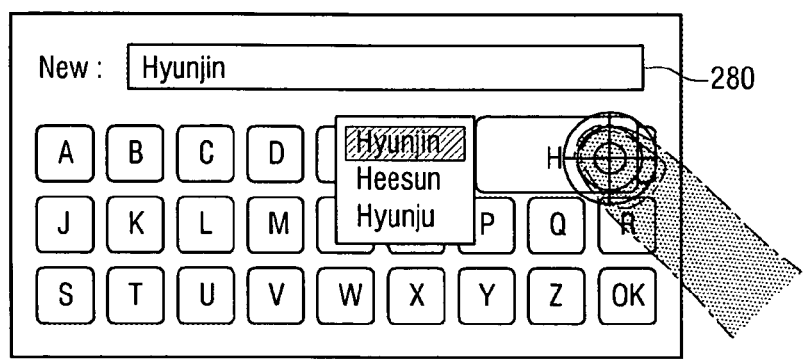

FIG. 7D illustrates that the user's hand touches the character "H" with a pressure intensity greater than the second reference value. In response to the user's hand touching the character "H" with a pressure intensity greater than the second reference value, one of the predetermined terms related to the character "H" is input in the input window 280 as illustrated in FIG. 7O. In response to the user's hand continuing to touch the character "H" with a pressure intensity greater than the second reference value, the displayed predetermined terms are sequentially selected and input in the input window 280 according to the time during which the character is touched. For example, in response to the user touching the character "H" with a pressure intensity greater than the second reference value for 1 second, "Hyunjin" is input, in response to the user touching the character "H" with a pressure intensity greater than the second reference value for 2 second, "Heesun" is input, in response to the user touching the character "H" with a pressure intensity greater than the second reference value for 3 second, "Hyunju" is input, and in response to the user touching the character "H" with a pressure intensity greater than the second reference value for 4 second, "Hyunjin" is input.

FIG. 8 is a flow chart illustrating an operation of an electronic apparatus according to an embodiment of the present invention. Referring to FIG. 8, if the control unit 170 receives position data from the position detector 164 in operation 8300, the control unit 170 identifies a type of an object displayed at the corresponding position in operation 8310, and determines whether pressure data is received from the pressure detector 166 in operation 8320. If pressure data in not received from the pressure detector 166 in operation 8320 or the control unit 170 determines that the pressure is lower than a first reference value in operation 8330, the control unit 170 recognizes an operation of a user to be an approaching operation in operation 8350.

If the control unit 170 determines that the pressure is higher than the first reference value in operation 8330 and lower than a second reference value in operation 340, the control unit 170 recognizes an operation of the user to be a touching operation in operation 8360. If the control unit 170 determines that the pressure is higher than the second reference value in operation 8340, the control unit 170 recognizes an operation of the user to be a pressing operation in operation 8370.

In operation 8380, the control unit 170 displays data related to the object according to a result of the recognition of operations 8350, 8360, and 8370. That is, the control unit 170 receives position data, determines what type of object is displayed at the corresponding position, receives pressure data, and displays data related to the object according to the pressure intensity.

As described above, a user interface can be operated in diverse manners according to a position and a pressure intensity at which a user command is input, so the user can manipulate electronic apparatuses with greater convenience. That is, according to aspects of the present invention, a manner for operating a user interface changes by recognizing a user command differently according to the type of object displayed on a position at which the user command is input and according to the pressure intensity to manipulate a touch screen. Hence, efficient manipulation of electronic apparatuses is enabled.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CO-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electronic device comprising:
   a display;
   a first sensor configured to detect a touch to the display;
   a second sensor configured to detect a touch pressure; and
   a processor configured to:
      control the display to present a plurality of objects that are each selectable by the touch on a position of the display corresponding thereto via a cursorless user interface,
      identify one of the plurality of objects based on the touch to the display presenting the cursorless user interface,
      control the display to present the one of the plurality of objects with a visual differentiation that denotes the one of the plurality of objects as being identified based on the touch to the display presenting the cursorless user interface,
      determine whether the touch to the display presenting the cursorless user interface corresponds to:
         a first input type in which the detected touch pressure of the touch to the display presenting the cursorless user interface is less than or equal to a threshold, or
         a second input type in which the detected touch pressure of the touch to the display presenting the cursorless user interface is greater than the threshold,
      in response to the touch to the display presenting the cursorless user interface being determined to correspond to the first input type, execute an operation related to the identified object and present information based on the execution,
      in response to the touch to the display presenting the cursorless user interface being determined to correspond to the second input type, control the display to present both the identified object and a menu related to the identified object, the menu related to the identified object being presented without overlapping and spaced apart from the identified object,
      while both the identified object and the menu related to the identified object are presented, detect another touch to the display,
      in response to a determination that the other touch to the display is to a position of the display corresponding to an item of the related menu, while both the identified object and the menu related to the identified object are presented, identify a selection of the item of the related menu, and
      in response to a determination that the other touch to the display is to a position of the display corresponding to the identified object, while both the identified object and the menu related to the identified object are presented, identify a selection of the identified object.

2. The electronic device of claim 1, wherein, when presented, the menu related to the identified object is provided in a pop-up window.

3. The electronic device of claim 1, wherein the first sensor comprises a capacitance touch sensor.

4. The electronic device of claim 1, wherein another object from the plurality of objects is presented on the display while the identified object and the menu related to the identified object are presented on the display.

5. The electronic device of claim 1, wherein the identified object comprises an icon.

6. The electronic device of claim 5, wherein the icon corresponds to an operation that is executed in response to selection of the icon.

7. The electronic device of claim 6, wherein, in response to the touch to the display presenting the cursorless user interface being determined to correspond to the first input type, the processor executes the operation corresponding to the icon.

8. The electronic device of claim 1, wherein, in response to the touch to the display presenting the cursorless user interface being determined to correspond to the second input type, if the identified object comprises a menu, the processor controls the display to present a plurality of sub-menus corresponding to the menu.

9. The electronic device of claim 1,
   wherein, if an object is identified based on a touch to the display presenting the cursorless user interface while a plurality of objects related to content are presented, the processor is further configured to control the display to present the menu related to the content, and
   wherein, if an object is identified based on a touch to the display presenting the cursorless user interface while a plurality of objects related to a function are presented, the processor is further configured to control the display to present the menu related to the function.

10. The electronic device of claim 1, wherein the menu related to the identified object is presented without overlapping any of the plurality of objects.

11. A method of an electronic device, the method comprising:
presenting a plurality of objects that are each selectable by a touch on a position of a display corresponding thereto via a cursorless user interface;
detecting the touch to the display presenting the cursorless user interface with a first sensor;
detecting a pressure of the touch to the display presenting the cursorless user interface with a second sensor;
identifying one of the plurality of objects based on the touch to the display presenting the cursorless user interface;
presenting the one of the plurality of objects with a visual differentiation that denotes the one of the plurality of objects as being identified based on the touch to the display presenting the cursorless user interface;
determining whether the touch to the cursorless user interface corresponds to:
a first input type in which the detected touch pressure of the touch to the display presenting the cursorless user interface is less than or equal to a threshold, or
a second input type in which the detected touch pressure of the touch to the display presenting the cursorless user interface is greater than the threshold;
in response to the touch to the display presenting the cursorless user interface being determined to correspond to the first input type, executing an operation related to the identified object and presenting information based on the execution;
in response to the touch to the display presenting the cursorless user interface being determined to correspond to the second input type, presenting both the identified object and a menu related to the identified object, the menu related to the identified object being presented without overlapping and spaced apart from the identified object;
while both the identified object and the menu related to the identified object are presented, detecting another touch to the display;
in response to a determination that the other touch to the display is to a position of the display corresponding to an item of the related menu, while both the identified object and the menu related to the identified object are presented, identifying a selection of the item of the related menu; and
in response to a determination that the other touch to the display is to a position of the display corresponding to the identified object, while both the identified object and the menu related to the identified object are presented, identifying a selection of the identified object.

12. The method of claim 11, wherein, when presented, the menu related to the identified object is provided in a pop-up window.

13. The method of claim 11, wherein the first sensor comprises a capacitance touch sensor.

14. The method of claim 11, wherein another object from the plurality of objects is presented on the display while the identified object and the menu related to the identified object are presented on the display.

15. The method of claim 11, wherein the identified object comprises an icon.

16. The method of claim 15, wherein the icon corresponds to an operation that is executed in response to selection of the icon.

17. The method of claim 16, wherein, in response to the touch to the display presenting the cursorless user interface being determined to correspond to the first input type, the operation corresponding to the icon is executed.

18. The method of claim 11, wherein, in response to the touch to the display presenting the cursorless user interface being determined to correspond to the second input type, if the identified object comprises a menu, a plurality of submenus corresponding to the menu are presented.

19. The method of claim 11, wherein the menu related to the identified object is presented without overlapping any of the plurality of objects.

20. A non-transitory computer readable medium storing instructions that, when executed by at least one processor of an electronic device, cause the at least one processor to control the electronic device to perform the operations of:
presenting a plurality of objects that are each selectable by a touch on a position of a display corresponding thereto via a cursorless user interface;
detecting the touch to the display presenting the cursorless user interface with a first sensor;
detecting a pressure of the touch to the display presenting the cursorless user interface with a second sensor;
identifying one of the plurality of objects based on the touch to the display presenting the cursorless user interface;
presenting the one of the plurality of objects with a visual differentiation that denotes the one of the plurality of objects as being identified based on the touch to the display presenting the cursorless user interface;
determining whether the touch to the display presenting the cursorless user interface corresponds to:
a first input type in which the detected touch pressure of the touch to the display presenting the cursorless user interface is less than or equal to a threshold, or
a second input type in which the detected touch pressure of the touch to the display presenting the cursorless user interface is greater than the threshold;
in response to the touch to the display presenting the cursorless user interface being determined to correspond to the first input type, executing an operation related to the identified object and presenting information based on the execution; and
in response to the touch to the display presenting the cursorless user interface being determined to correspond to the second input type, presenting both the identified object and a menu related to the identified object, the menu related to the identified object being presented without overlapping and spaced apart from the identified object;
while both the identified object and the menu related to the identified object are presented, detecting another touch to the display;
in response to a determination that the other touch to the display is to a position of the display corresponding to an item of the related menu, while both the identified object and the menu related to the identified object are presented, identifying a selection of the item of the related menu; and
in response to a determination that the other touch to the display is to a position of the display corresponding to the identified object, while both the identified object and the menu related to the identified object are presented, identifying a selection of the identified object.

21. The medium of claim 20, wherein, when presented, the menu related to the identified object is provided in a pop-up window.

22. The medium of claim 20, wherein the first sensor comprises a capacitance touch sensor.

23. The medium of claim 20, wherein another object from the plurality of objects is presented on the display while the identified object and the menu related to the identified object are presented on the display.

24. The medium of claim 20, wherein the identified object comprises an icon.

25. The medium of claim 24, wherein the icon corresponds to an operation that is executed in response to selection of the icon.

26. The medium of claim 25, wherein, in response to the touch to the display presenting the cursorless user interface being determined to correspond to the first input type, the operation corresponding to the icon is executed.

27. The medium of claim 20, wherein, in response to the touch to the display presenting the cursorless user interface being determined to correspond to the second input type, if the identified object comprises a menu, a plurality of submenus corresponding to the menu are presented.

28. The medium of claim 20, wherein the menu related to the identified object is presented without overlapping any of the plurality of objects.

* * * * *